F. BOLD.
COMBINED MICROSCOPE AND COMPASS.
APPLICATION FILED SEPT. 15, 1919.
1,331,093.                                                                 Patented Feb. 17, 1920.
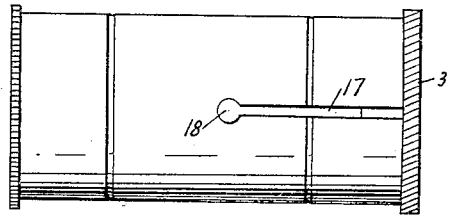
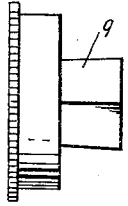 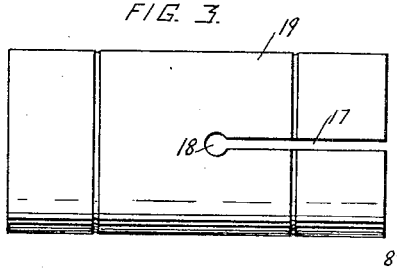  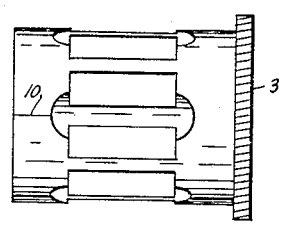
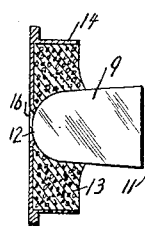 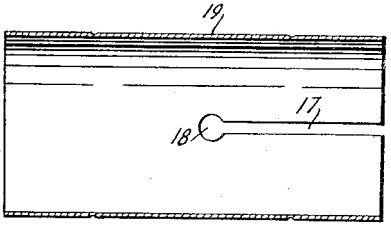 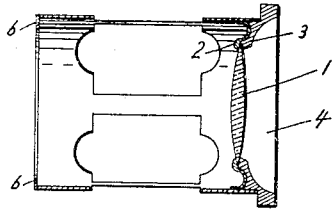
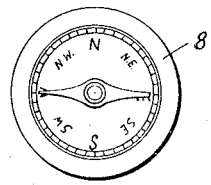
INVENTOR.
F. BOLD,
BY
ATT'Y.

UNITED STATES PATENT OFFICE.

FRED BOLD, OF LOS ANGELES, CALIFORNIA.

COMBINED MICROSCOPE AND COMPASS.

1,331,093.  Specification of Letters Patent.  Patented Feb. 17, 1920.

Application filed September 15, 1919. Serial No. 323,776.

*To all whom it may concern:*

Be it known that I, FRED BOLD, a citizen of the United States, residing at Los Angeles, in the county of Los Angeles and State of California, have invented new and useful Improvements in Combined Microscopes and Compasses, of which the following is a specification.

The object of the present invention is to provide a combined microscope and compass, especially adapted for use by miners when prospecting, and which will contain in a compact and convenient form a low power microscope, a high power microscope, and a compass, all of which are necessary in prospecting for gold or other precious metals.

In the accompanying drawing, Figure 1 is a side view of my improved combination microscope and compass; Fig. 2 is a side view of a high power microscope; Fig. 3 is a side view of a casing; Fig. 4 is a side view of a compass; Fig. 5 is a side view of a low power microscope; Fig. 6 is a sectional view of a high power microscope; Fig. 7 is a sectional view of a casing; Fig. 8 is a sectional view of a low power microscope; Fig. 9 is a plan view of the compass.

Referring to the drawing, 1 indicates a lens of a low power microscope, the rim of which is supported in an eye-piece 2, from which extends a cylindrical frame 3 cut out to provide openings 4 to admit light into the interior of said frame. The end of the frame remote from the lens is formed with a narrow inwardly extending flange 6 which forms a seat for the frame 7 of a compass 8. For the purpose of securely holding the compass frame in its seat, the frame of the low power microscope is slit longitudinally from its open end, as shown at 10, and said frame is made of spring material, so that the portions of the frame on opposite sides of said slit will spring apart and by their resiliency hold said frame firmly in its seat.

9 indicates a lens of a high power microscope having a flat side 11 on which to place the small particles of gold or other metals to be examined, the other end 12 of the lens being spherical and embedded in cement 13 contained in a cylindrical casing 14, having a central opening 16 to expose the spherical end of the lens, the spherical end being, however, below the plane formed by the end of the casing to avoid injury to the glass surface of the lens by contact with abrasive material. The frame 3 of the low power microscope and the frame 4 of the high power microscope fit snugly in opposite ends of a cylindrical casing 19.

When the frame of the compass is placed in its seat of the frame of the low power lens, said frame is inserted in the one end, and the frame of the high power lens is inserted in the other end, of the cylindrical casing, which is formed with two diametrically opposite longitudinally extending recesses or slots 17 opening in the end nearest the low power microscope, these being adapted to receive a pin upon which an object to be observed by the low power microscope may be impaled, said slots being enlarged at their inner ends to form recesses 18 to receive said pin.

The mode of use of my improved microscope and compass will be apparent from the foregoing description. When the miner wishes to ascertain the direction in which he is traveling, he removes from the casing 19 the low power microscope containing the compass firmly held in its seat and places the low power microscope upon a level surface and the compass seated at the top of the frame of said microscope gives him the direction.

When he wishes to examine a specimen of rock quickly, he removes the compass from its seat in the frame of the low power microscope, and applies the low power microscope to the rock to inspect it. When he wishes to inspect the character of the rock more minutely, he breaks it up with his hammer and moistens his finger and applies some of the broken rock to the surface of the high power lens by means of his moistened finger and looks through the high power microscope at the fragments of rock, when the nature of the rock will be at once apparent.

I claim:—

A casing for a combination microscope and compass having two open ends, one of said ends being adapted to receive, fitting snugly therein the frame of a high power microscope, and the other end being adapted to receive fitting snugly therein the frame of a low power microscope, which has a low power lens secured in its outer end, and whose inner end forms a spring seat adapted to hold firmly therein a compass by said spring.

FRED BOLD.